Sept. 29, 1970 W. A. VISHER 3,531,728

BIAS REGULATED PUSH-PULL AMPLIFIER

Filed Dec. 24, 1968

INVENTOR.
Wilbur A. Visher
BY
Paul + Paul
ATTORNEYS.

United States Patent Office 3,531,728
Patented Sept. 29, 1970

3,531,728
BIAS REGULATED PUSH-PULL AMPLIFIER
Wilbur A. Visher, Ambler, Pa., assignor to Narco Scientific Industries, Inc., Fort Washington, Pa., a corporation of Delaware
Filed Dec. 24, 1968, Ser. No. 786,616
Int. Cl. H03f 3/26
U.S. Cl. 330—15 6 Claims

ABSTRACT OF THE DISCLOSURE

In a push-pull amplifier, the DC voltages developed at each end of the primary of the output transformer are summed and coupled in a feedback loop through a transistor regulator, the output of said transistor regulator being connected to the center tap of the secondary of the input transformer such that a stabilizing DC current is added to the amplifier input.

BRIEF SUMMARY OF THE INVENTION

This invention relates to a push-pull amplifier with a feedback loop designed to stabilize the amplifier transistors with respect to changes in temperature and DC power supply, and which also reduces distortion due to transistor cross-over.

BACKGROUND OF THE INVENTION

Field of the invention

This invention lies in the field of regulated transistor push-pull power amplifiers.

Description of the prior art

Push-pull amplifiers have long been used as output amplifiers because of the inherent characteristic of delivering high power efficiently and with reduction of distortion in the output. Since the advent of the large power transistor, there has been substantial circuit development of transistorized push-pull amplifiers. Transistorized push-pull circuits utilized for high output power share in common two primary defects, i.e., stability of the transistors used with respect particularly to temperature variations and power supply variations, and cross-over distortion which results from operation of the transistor at or near cut-off. The temperature variation problem is generally attacked by the design of stability circuits which involve local feedback connected with the transistor stage being stabilized. More sophisticated techniques use non-linear temperature compensating elements such as diodes and thermistors, such latter elements being selected to provide a circuit reaction to temperature variations roughly equal and opposite to the changes induced in the transistor being used. More sophisticated circuits employ the use of matching transistor pairs connected as in a differential amplifier and designed such that all variations due to temperature in one transistor are exactly balanced by similar variations in the other transistor. Similarly, a variety of techiniques have been designed to stabilize with respect to power supply variations. One technique is to use a Zener diode or other constant voltage element in connection with the specific transistor stage so as in effect to construct a separate power supply for that stage. With respect to the cross-over distortion, the conventional technique of biasing the transistors in a linear area just above cut-off is subject to normal bias instability. It is also common to design a distinct AC feedback path which, however, reduces AC gain. The result of such conventional circuit designs is generally a multitude of single stage and multi-stage feedback loops in addition to the introduction of additional and expensive non-linear compensating elements.

SUMMARY OF THE INVENTION

This invention relates to a new and novel means for regulating the stability and improving the cross-over distortion of a transistorized solid state power amplifier. The invention is particularly adapted for use as a high power output amplifier to be used in a system subject to large variations in temperature and power supply voltage. In the preferred embodiment of my invention, the conventional push-pull circuitry is comprised of an input transformer which drives two paths of cascaded transistors, arranged to conduct during alternate half-cycles of the input signal, which in turn drive the primary of an output transformer which is center tapped to ground. In my invention, the primary of said output transformer is designed to contain a small resistance such that a DC signal is available at each input terminal to said primary of the transformer. Such small resistance, of approximately 0.05 ohm, could be provided by resistors placed external to the transformer or by one resistor placed between the center tap and ground. Each such input terminal is in turn DC-connected through a resistance to the input of a regulator, thereby summing the signals developed at the two transformer terminals. The regulator is comprised of a transistor stage which provides linear amplification. The output signal developed from such regulator transistor is coupled through a resistor to the center tap of the secondary of the input transformer so as to provide a regulating input to the cascaded transistors, which input regulates against changes in the quiescent operation of the amplifier transistors, without significantly reducing the AC gain of the overall amplifier.

An object of my invention is a regulated push-pull amplifier which utilizes a regulator circuit to stabilize the amplifying transistors and to maintain optimum operating conditions in said amplifying transistors for reduction of cross-over distortion.

Another object of my invention is an efficient high power output transistor amplifier such that in the no-signal condition the power consumption is negligible and that the operating characteristics of the amplifier are invariable with changes in temperature and power supply voltage.

DETAILED DESCRIPTION OF THE DRAWINGS

Figure 1:
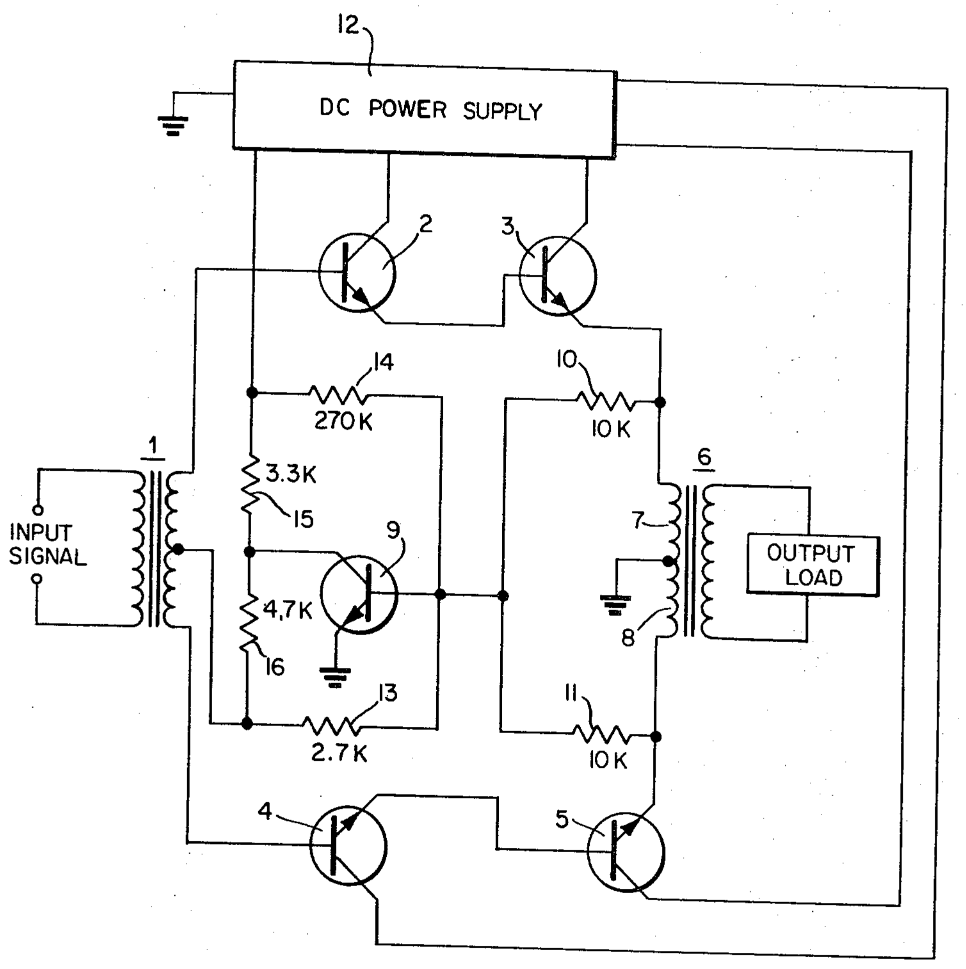
FIG. 1 shows a preferred embodiment of the bias regulated transistor push-pull amplifier in schematic form. Typical values are given for the elements associated with the novel regulator part of the circuit.

In FIG. 1, the input signal is introduced through the transformer 1, the secondary terminals of which are connected to transistors 2 and 4. In the embodiment here illustrated, there are two amplifier paths, through transistors 2 and 3 and through transistors 4 and 5, such transistors in this embodiment being connected as emitter followers. Transistors 2 and 4, as well as 3 and 5, are matched transistors and are biased to operate just slightly conducting. By operation of the center tapped input transformer secondary, when a positive signal is impressed upon the base of transistor 2, a negative signal of equal magnitude is impressed upon the base of transistor 4, and vice versa. Under the first condition, transistors 2 and 3 operate and amplify the incoming signal, driving the output transformer 6. The output signal from transistor 3 is impressed across the primary of the output transformer from transistor 3 emitter to center tap, being that section designated 7 on the drawing. When transistors 2 and 3 are conducting, transistors 4 and 5 are turned off. When the phase of the incoming signal is reversed and a positive signal is impressed upon the base of transistor 4, transistors 4 and 5 conduct and transistors 2 and 3 are cut off. In this mode of operation, the output signal is impressed across the primary of the output transformer from the emitter of transistor 5 to center ground, being that part of the transformer designated as 8 on the drawing. Sections 7 and 8 of transformer 6 contain a small but finite amount of resistance, causing a DC voltage to be developed at the emitters of transistors 3 and 5.

The regulator circuit is comprised of transistors 9 fed through resistors 10 and 11, the output of such transistor being connected to the center tap of the input transformer secondary. During the period of operation when transistors 2 and 3 are conducting, the signal appearing at the emitter of transistor 3 is fed through resistor 10 to the base of transistor 9. Correspondingly, when transistors 4 and 5 conduct, the signal appearing at the emitter of transistor 5 is fed through resistor 11 to the base of transistor 9. Resistors 10 and 11 are chosen of equal and high value such that the input signal to the base of transistor 9 is a summation of signals equally proportional to the currents through transistors 3 and 5, and is a small current signal, which aids in maintaining linear operation in transistor 9. Transistor 9 is biased primarily by resistors 13 and 14, and resistor 13 also provides negative feedback which contributes to linear operation of this stage. The output signal of transistor 9 is taken between resistors 13 and 16, and coupled to the center tap of the input transformer secondary.

To understand the stability features of the regulator circuit, assume an incremental change in the amount of no-signal current through transistor pair 2–3. Assuming that transistors 4 and 5 respectively are matched, a corresponding current change would occur through them. Such current change could occur due to either variation of the DC supply voltage 12 or due to a variation of the temperature. If an increased current flows, an increased DC voltage would appear across the small resistance in transformer winding 7 as well as transformer winding 8. Such increased positive voltage would be impressed upon the base of transistor 9, causing increased conduction through that transistor. Increased current into the collector of transistor 9 would cause an increased voltage drop across resistor 15, resulting in a drop of voltage at the center tap of the transformer, which lower DC voltage would be impressed upon the bases of transistors 2 and 4. Thus, a postulated increase of current through the transistors would result in a more negative voltage applied to the bases of transistors 2 and 4, which voltage would reduce conduction through these transistors and thus stabilize their operation. An alternate method of examining the effect of transistor 9 is to view it as a variable resistance. An increased current flow through transistors 3 and 5 would cause a small but finite increase of current into the base of transistor 9. Such an increase of current would make transistor 9 more conductive and cause it to appear, between collector and emitter, as a smaller resistance shunting resistor 16. Consequently, some of the bias current coming from the DC power supply 12 through resistor combination 15 and 16 is shunted through transistor 9, and the amount passing into transistors 2 and 4 is reduced, thus compensating for the increase in current. Conversely, a decrease in current through the amplifier transistors would cause transistor 9 to appear to be a greater resistance, causing an increase in the amount of current which is fed into the bases of transistors 2 and 4.

Figure 2:
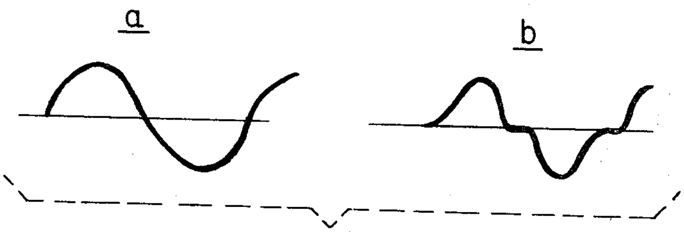
FIG. 2*a* shows a sinusoidal input signal and FIG. 2*b* shows the output which would occur due to cross-over distortion in an unregulated amplifier.

In push-pull operation, efficiency is maximized by operating class B, in which mode the transistors would be biased just at cut off. However, biasing at or near cut off causes cross-over distortion in the output, due to the non-linear properties of the transistor when so biased. Such cross-over distortion is illustrated in FIG. 2, FIG. 2*a* representing an input sinusoidal wave, and FIG. 2*b* representing an output wave form which includes cross-over distortion. The regulator circuit of this invention acts to reduce the presence of such cross-over distortion by stabilizing the idle, or no-signal current at a value where cross-over distortion is minimized. Once the bias conditions have been set, the regulator action will minimize transistor drift into non-linear operation where cross-over distortion occurs. Thus, the transistors can be biased for minimum idle current compatible with linear operation, and such bias will be maintained under varying conditions of temperature and power supply.

The regulator circuit of this invention does not provide a feedback path to AC signals developed at the amplifier output. In the preferred embodiment, there is mutual magnetic coupling between parts 7 and 8 of transformer 6, which coupling causes an AC signal through either part to induce a like signal of equal and opposite polarity across such other part, thereby causing the summation of the AC signals developed at the base of transistor 9 to be appreciably zero. This arrangement thereby achieves a high gain DC feedback which stabilizes the amplifier operation, without reducing overall AC signal gain appreciably. Tests of this invention have shown stability to be improved by more than an order of magnitude, while overall signal gain is maintained at approximately 95% of unregulated gain. Additional stability can be achieved by increasing the DC gain through the regulator.

Although this invention has been described with reference to a specific form thereof, it would be appreciated that other variations may be made without departing from the spirit and scope of the invention. In the embodiment illustrated in FIG. 1, typical values of resistance have been given, but such values will vary with the choice of transistors and DC power supply voltage, with the qualification that the summing resistors 10 and 11 must always be of equal value. It is to be noted that the cascaded transistor paths may be arranged in other configurations, and any number of transistors, from 1 to *n*, may be cascaded. If the amplified paths contribute 180 degrees phase shift, the regulator circuit would then be comprised of an even number of transistors, so as to provide a full loop phase shift of 180 degrees. Further, the transistors can be replaced with vacuum tubes, in which event the operation of such vacuum tubes would be stabilized with respect to supply voltage. It is also conventional in the art to utilize circuitry other than a transformer for both input and output means.

What is claimed is:

1. A bias regulated push-pull amplifier comprising:

(a) signal source means, said means being capable of providing two signals of equal magnitude and opposite polarity;

(b) paths of cascaded amplifier stages, each path coupled to and respectively driven by one of the signal outputs available from said signal source means;

(c) an output transformer having a primary winding having a small resistance to DC current;

(d) coupling means, coupling the output of each of said paths of amplifier stages separately to opposite terminals of said output transformer;

(e) regulator means for regulating the input to said signal source means;

(f) summing means for defining a summing point, comprised of two resistors of equal value each connected respectively to said opposite terminals of said primary winding and connected commonly to said summing point, said summing point connected to said regulator means, thereby providing a summed regulator signal; and, (g) coupling means by which the output of said regulator is coupled into the input of each of said paths of amplifier stages.

2. A bias regulated push-pull amplifier in accordance with claim 1 wherein the output of each path of amplifier stages is connected to respective opposite terminals of said primary winding said primary winding having a finite resistance to DC current between each such terminal and the center tap thereof.

3. A bias regulated push-pull amplifier in accordance with claim 1 wherein the regulator means is comprised of a transistorized amplifier, being biased for linear operation, with negative feedback by resistive coupling from the output to input of said regulator, and with the output coupled mutually to the input of each path of cascaded amplifier stages.

4. A bias regulated push-pull amplifier comprising:

(a) conventional push-pull amplifier means, including an input circuit, amplification channels, and an output transformer;

(b) means providing a small resistance to DC current coupled between said amplification channels and said output transformer so as to develop DC voltage signals at the output terminals of the amplification channels proportional to the DC currents in the outputs of said amplification channels;

(c) regulator means, providing linear amplification of said DC voltage signals;

(d) summing means for defining a summing point, comprised of two resistors of equal value each connected respectively to said opposite terminals of said primary winding and connected commonly to said summing point, said summing point connected to said regulator means, thereby providing a summed regulator signal;

(e) additional coupling means, coupling the output of said regulator means mutually to the inputs of the amplification means.

5. Push-pull amplifier apparatus comprising:

(a) signal source means for providing two signals of equal magnitude and opposite polarity;

(b) amplifier means for providing two channels of amplification, coupled to and driven by said two source signals;

(c) an output transformer having a center tapped primary winding, which winding has a small resistance to DC current, the center tap dividing said primary winding into two portions;

(d) first coupling means, for coupling the output of each of said amplifier channels separately to opposite terminals of said primary winding, such that the output signals from said channels are developed respectively between said opposite terminals and said center tap;

(e) regulator means for regulating the input to said signal source means;

(f) summing means for defining a summing point, comprised of two resistors of equal value each connected respectively to said opposite terminals of said primary winding and connected commonly to said summing point, said summing point connected to said regulator means, thereby providing a summed regulator signal; and (g) third coupling means by which the output of said regulator means is coupled into the input of said signal source means.

6. The push-pull amplifier apparatus as disclosed in claim 5, wherein:

said two portions of said primary winding have mutual magnetic coupling therebetween, whereby said two portions cooperate with said second coupling means to attenuate the AC component of the signal coupled to said regulating means.

References Cited

UNITED STATES PATENTS

| | | | |
|---|---|---|---|
| 2,921,266 | 1/1960 | Kiebert | 330—81 X |
| 3,381,235 | 4/1968 | Campbell | 330—26 |

ROY LAKE, Primary Examiner

L. J. DAHL, Assistant Examiner

U.S. Cl. X.R.

330—22, 25